United States Patent [19]

Stoeppelmann et al.

[11] Patent Number: 5,716,684
[45] Date of Patent: Feb. 10, 1998

[54] MULTILAYER POLYMER PIPE

[75] Inventors: Georg Stoeppelmann, Bonaduz; Wolfgang Pfleger, Tamins, both of Switzerland

[73] Assignee: Ems-Inventa AG, Zurich, Switzerland

[21] Appl. No.: 446,663

[22] PCT Filed: Sep. 28, 1994

[86] PCT No.: PCT/EP94/03239
§ 371 Date: May 26, 1995
§ 102(e) Date: May 26, 1995

[87] PCT Pub. No.: WO95/09081
PCT Pub. Date: Apr. 6, 1995

[30] Foreign Application Priority Data

Sep. 28, 1993 [DE] Germany .............. 43 33 002.9
Sep. 27, 1994 [DE] Germany .............. 44 34 530.5

[51] Int. Cl.⁶ .................. B32B 27/34; B32B 27/08; F16L 9/14
[52] U.S. Cl. ............ 428/36.91; 428/35.7; 428/215; 428/421; 428/474.4; 428/475.8; 528/178; 138/137; 138/141; 138/DIG. 3
[58] Field of Search .................. 428/35.7, 36.6, 428/36.7, 36.91, 332, 339, 421, 474.9, 475.8, 215, 474.4; 138/137, 141, DIG. 1, DIG. 3, DIG. 7; 525/178

[56] References Cited

U.S. PATENT DOCUMENTS

| 4,585,701 | 4/1986 | Bartoszek et al. | 428/421 |
| 4,886,689 | 12/1989 | Kotliar et al. | 428/35.7 |
| 5,112,692 | 5/1992 | Strassel et al. | 428/421 |
| 5,320,888 | 6/1994 | Stevens | 428/36.91 |
| 5,419,374 | 5/1995 | Nawrot et al. | 138/137 |
| 5,441,782 | 8/1995 | Kawahima et al. | 428/36.9 |

FOREIGN PATENT DOCUMENTS 0 198 723 10/1986 European Pat. Off. .

OTHER PUBLICATIONS

Computerized Infra-red Study Of The Interaction Of Poly(vinylidene fluoride) With Stereoregular Poly(methyl methacrylate), Polymer, vol. 21, May, pp. 509–513 (1980), E. Roerdink and G. Challa, Dept. of Polymer Chemistry, State University of Groningen, The Netherlands (revised 11 Oct. 1979).

A Fourier Transform Infrared Study Of Polymer Blends. I. Poly(vinylidene fluoride)—Poly(methyl methacrylate) System, Polymer Letters Edition, vol. 15, pp. 745–750 (1977), M. M. Coleman et al.

Primary Examiner—Ellis Robinson
Attorney, Agent, or Firm—Standley & Gilcrest

[57] ABSTRACT

The present invention relates to polyamide/polyvinylidine fluoride blends and multilayer tubes made therefrom. The blends have spherical morphology and a polyamide matrix with dispersed polyvinylidine fluoride phases; with the polyamide of the polyamide/polyvinylidine fluoride blend having a shear viscosity of 1.5 to 7 times greater than that of the polyvinylidine fluoride of blend.

6 Claims, 1 Drawing Sheet

MULTILAYER POLYMER PIPE

TECHNICAL FIELD

This invention concerns polymer laminates and multilayer polymer tubes made therefrom.

BACKGROUND

The invention particularly concerns a multilayer polymer tube produced by coextrusion. The term "tube" in the context of the invention encompasses both hard pipe and soft tubing. Tubes according to the invention can be fashioned smooth or corrugated and serve to transport chemical agents, such as freon in refrigeration lines. The preferred field of application, however, is the automotive sector, especially as fuel lines or coolant liquid lines.

Tubes made of polyamide are familiar and have diverse uses. Single-layer tubes do not meet the necessary requirements such as inertness with respect to the agent flowing through them, resistance to high and low temperature and resistance against mechanical stresses. During transport of, for example, aliphatic or aromatic solvents, when subjected to external force etc., considerable disadvantages are evident such as an inadequate barrier effect against the materials to be transported, undesirable changes, or inadequate mechanical loading capability.

Attempts have already been made to eliminate these drawbacks by using multilayer tubes, but this merely avoided specific disadvantages and failed to attain the desired overall pattern of properties. For example, in multilayer tubes it is difficult to promote adhesion between the individual tube layers.

In the patent applications of ATOCHEM EP 0 558 373, EP 0 198 723 and U.S. Pat. No. 5,112,692 it is described that polymers containing carbonyl groups can function as an adhesion promoter between PVDF and polymers that are not miscible with PVDF. On the other hand it has long been known that specific interactions occur between PVDF and the carbonyl group (E. Roerdink, G. Challa, Polymer 21 (1980), 509 and M. M. Coleman et al., J. Polym. Science, Polymer Lett. Ed. 15 (1977), 745). It is therefore not surprising that polymers containing carbonyl groups are partially compatible with PVDF. This partial miscibility alone is, however, not sufficient to allow for example polyamide/PVDF blends to act as an adhesion promoter between polyamide and PVDF. Nor does restriction to specific concentration ranges necessarily provide good adhesion between the adhesion promoter on the one hand and the inner and outer layer on the other. The dwell times during mixing of the individual layers in the coextrusion head are very short, so that the distribution of the molten polymers and the morphologies that occur strongly influence the adhesion of the individual layers.

SUMMARY OF THE INVENTION

Therefore, the present invention has the object to provide a novel polyamide/polyvinylidine fluoride blend which can be used in the production of a tube that offers good barrier properties with respect to the materials to be transported, dimensional stability, and good mechanical loading characteristics. In particular, the tube must resist mechanical stresses without experiencing separation of the tube layers.

This problem is solved by a polyamide/polyvinylidine fluoride blend (PA/PVDF blend) with spherical morhpology, having a PA matrix with dispersed PVDF phases, where the polyamide of the polyamide/PVDF blend has a shear viscosity 1.5 to 7 times greater than the PVDF of the blend.

Also the above problem is solved by a multilayer polymer tube with an outer layer based on polyamide and an inner layer of polyvinylidene fluoride (PVDF) or its copolymers, where the inner layer and outer layer are tightly bonded with each other by at least one adhesion promoting intermediate layer of a polyamide/PVDF and with the aforementioned special morphology.

It has been found that polyvinylidene fluoride surprisingly exhibits excellent high temperature and hydrolysis resistance as well as barrier properties with respect to chemical agents, particularly against pure hydrocarbons as well as against alcohol or their mixtures. To assure that the inner and outer layers are tensionally bonded to each other, an intermediate, adhesion-promoting layer is required. Surprisingly, an intermediate layer containing PVDF or its copolymer or their blend or mixture exhibits the required adhesion, both with respect to the outer and to the inner layer. This intermediate layer can contain PVDF or its copolymers in all weight proportions; preferred are proportions smaller [than ] 70 and those smaller [than] 50 are especially desirable. Particularly well suited is an intermediate layer that consists of a blend or mixture of PVDF or its copolymer and a homo- or copolyamide or their mixtures or blends. In this context the polyamide of the outer layer should preferably be identical to the polyamide component of the intermediate layer. Especially good adhesion occurs when the PA/PVDF blend has a spherical morphology, in which the PVDF is finely dispersed in a PA matrix, i.e. a PA matrix with a dispersed PVDF phase. This morphology occurs only under specific viscosity conditions between PA and PVDF. In particular, the shear viscosity of the polyamide component, e.g. PA12, must be greater than the shear viscosity of the PVDF by a factor of preferably 1.5 to 7, most preferably by a factor of 2 to 4.

In addition to the right viscosity conditions, the extrusion temperature plays an important role in the production of PA/PVDF, preferably PA12/PVDF, adhesion-promoting blends. No effective adhesion effect is seen if melt temperatures of 270° C. are exceeded. Preferred temperatures are 220° C. to 270° C., especially desirable are 250° C. to 270° C. It is particularly desirable that the intermediate layer contain approx. 70% by weight of PA11 or 12 and approx. 30% by weight of PVDF.

In a further embodiment, the intermediate layer consists of a blend or mixture of PVDF or its copolymer and a functionalized polymer, preferably a homo- or copolyolefin grafted with aliphatic unsaturated carboxylic acids or their derivatives, particularly a grafted polyethylene, polypropylene, styrene-butadiene-styrene block copolymer, styrene-(ethylene-co-butylene)-styrene block copolymer, styrene-(ethylene-co-propylene) block copolymer, or styrene-isoprene-styrene block copolymer.

Suitable polycondensates of aliphatic lactams or ω-amino carboxylic acids with from 4 to 44 carbon atoms, preferably from 4 to 18 carbon atoms, or polycondensates of aromatic ω-aminocarboxylic acids with from 6 to 20 carbon atoms are employed as polyamides.

Also suitable are polycondensates of at least one diamine and at least one dicarboxylic acid, each with from 2 to 44 carbon atoms. Examples of such diamines are ethyldiamine, 1,4-diaminobutane, 1,6-diaminohexane, 1,10-diaminododecane, 1,12 diaminododecane, m- and p-xylylenediamine, cyclohexyldimethyleneamine, bis-(p-aminocyclohexyl)-methane and its alkyl derivatives.

Examples of dicarboxylic acids are succinic, glutaric, adipic, pimelic, suberic, azelaic and sebacic acid, dodecanedicarboxylic acid, 1,6-cyclohexanedicarboxylic acid, terephthalic acid, isophthalic acid and napthalene dicarboxylic acid.

Especially suitable are polyamides or copolyamides based on the monomers of PA6, PA6,6, PA12, PA6,12, PA11, PA12,12, PA10,12, PA6,9, PA6T, PA6,I, PA12,T, PA12,I and PA12/6 T and their mixtures.

The above polyamides can contain the usual additives such as UV and heat stabilizers, impact modifiers, crystallization accelerators, plasticizers, flame-retardant materials, lubricants, antistatic materials, fillers, reinforcement fibers as well as additives to increase electrical conductivity. PVDF can likewise contain similar required additives as appropriate.

DETAILED DESCRIPTION OF THE PREFERRED EMBODIMENT

For special applications, e.g. flexible coolant fluid lines, it is possible to fashion the tubes according to the invention with annular or spiral corrugation.

The individual polymer layers of the tube according to the invention should preferably have the following layer thicknesses:

Outer Layer 0.1 mm to 2.0 mm, preferably 0.3 mm to 1.0 mm, most preferably 0.5 mm to 1.0 mm.

Intermediate Layer 0.05 mm to 0.5 mm, preferably 0.1 mm to 0.3 mm, most preferably 0.1 mm to 0.2 mm.

A preferred embodiment of the multilayer polymer tube according to the invention has an outer layer of PA12 or PA11, an inner layer of PVDF and an intermediate layer of a mixture of PVDF and PA12 or PA11, and is especially suitable for use as a gasoline fuel line.

A second preferred embodiment has an outer layer of PA12 or PA11, an inner layer of PVDF and an intermediate layer of a mixture of PVDF and a polypropylene grafted with maleic acid anhydride, and is especially suitable for use as a coolant fluid line.

It is possible to apply at least one protective layer on the outer layer of PA, so that tubes according to the invention can have a total of more than three layers.

Figure 1:
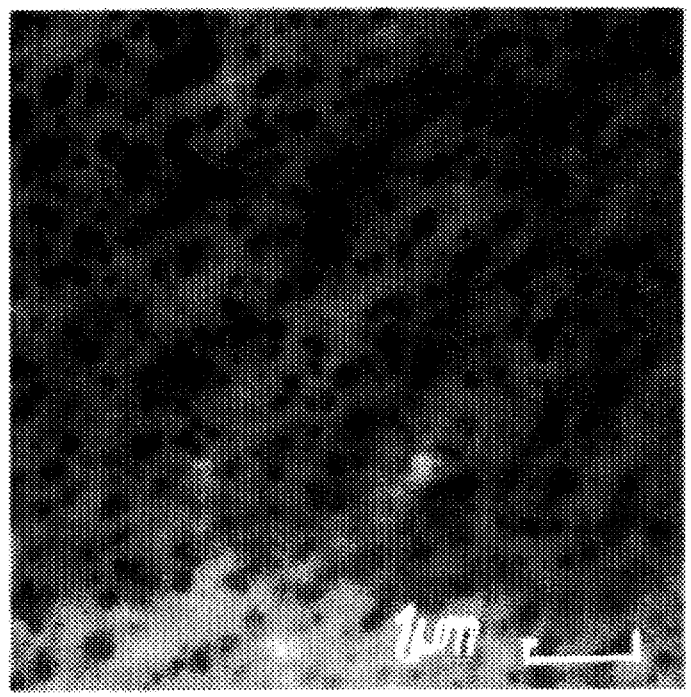
FIG. 1 is a photomicrograph of a polymeric blend in accordance with one embodiment of the present invention, as described in Example 4.
Figure 2:
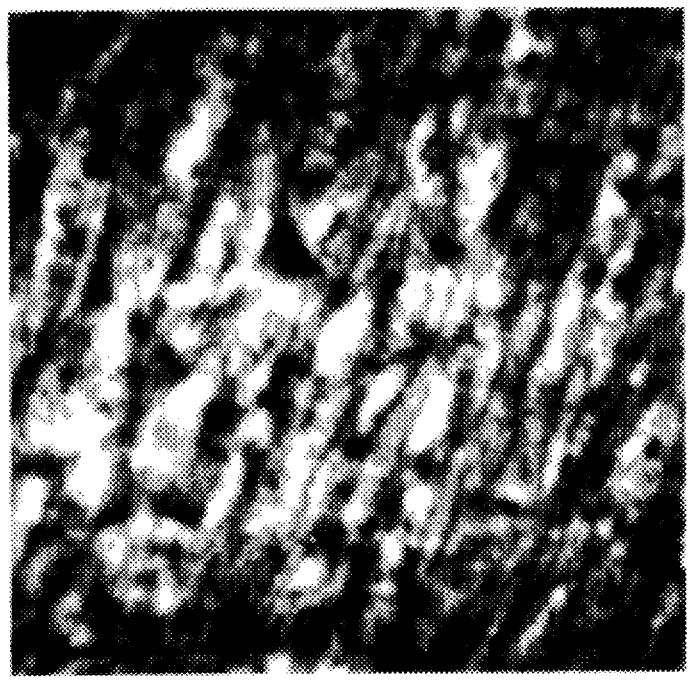
FIG. 2 is a photomicrograph of a polymeric blend outside the scope of the present invention, as described in Example 4.

The invention will now be further described with reference to the illustrations, where FIG. 1 illustrates a 70/30 blend of PA12/PVDF, and FIG. 2 illustrates a 50/50 blend of PA12/PVDF.

In the examples below, the following commercial products were used:

Grilamid L25H: A heat-stabilized polyamide 12, of the firm EMS-CHEMIE AG

Grilamid L25: A pure polyamide 12, of the firm EMS-CHEMIE AG

Admer QF500: A polypropylene grafted with maleic acid anhydride, of the firm MITSUI Solef 1008/0001: A PVDF, of the firm SOLVAY

EXAMPLES 1 to 3

Three-layer robes were produced on a state-of-the-art coextrusion system with three extruders. Their respective layer sequences are summarized in Table 1.

TABLE 1

| | Three-layer tube | | |
|---|---|---|---|
| | Example 1 | Example 2 | Example 3 |
| Outer layers | Grilamid L25H | Grilamid L25 | Grilamid L25 |
| Thickness | 1.0 mm | 0.6 to 0.7 mm | 0.6 to 0.7 mm |
| Intermediate layer | Blend of: Admer QF500: 50% by weight Solef 1010/0001: 50% by weight | Mixture of: Solef 1008/0001: 40% by weight Grilamid L25: 60% by weight | Mixture of: Solef 1008/0001: 30% by weight Grilamid L25: 70% by weight |
| Thickness | 0.1 mm | 0.1 to 0.2 mm | 0.1 to 0.2 mm |
| Inner layer | Solef 1010/0001 | Solef 1008/0001 | Solef 1008/0001 |
| Thickness | 0.3 mm | 0.2 mm | 0.2 mm |
| Tube diameter | 20 mm | 8 mm | 8 mm |
| Tube wall thickness | 1.5 mm | 1 mm | 1 mm |

Inner Layer 0.05 mm to 0.5 mm, preferably 0.1 mm to 0.4 mm, most preferably 0.2 mm to 0.3 mm.

EXAMPLE 4

The following PA12/PVDF blends were produced and tested for their adhesion promoting properties.

| PA 12 (% by weight) | 70 | 70 | 50 |
|---|---|---|---|
| PVDF (% by weight) | 30 | 30 | 50 |
| Shear viscosity PA 12/ Shear viscosity PVDF [Pa.s] measured at a shear velocity of 10 sec. and 240° C. | 3000/900 = 3.33 | 3000/3000 = 1 | 3000/900 = 3.33 |
| Adhesion PVDF/adhesion promoter/PA 12 | yes | no | no |
| Morphology | Sphere | Lamellar | Lamellar (cocontinuous) |

It can be noted that in a blend with a polamide: PVDF ratio of 70:30, where the PA has a shear viscosity 3.33 times greater than the PVDF, adhesion promotion takes place and the PA/PVDF blend has a spherical morphology (FIG. 1).

A blend of PA 12 and PVDF in a 50:50 ratio shows neither a spherical morphology nor does it bring about adhesion promotion (FIG. 2).

What is claimed is:

1. A polyamide/polyvinylidine fluoride blend, said blend having spherical morphology and having a polyamide matrix with dispersed polyvinylidine fluoride phases having a spherical morphology; wherein said polyamide is a polyamide 12 and wherein the weight ratio of said polyamide to said polyvinylidine fluoride in said blend is 70:30; and wherein said polyamide of said polyamide/polyvinylidine fluoride blend has a shear viscosity of 3.33 times greater than that of said polyvinylidine fluoride of said blend, wherein said blend is produced by extrusion at a temperature in the range of 220° to 270° C.

2. A multilayer polymer tube having an outer layer comprising polyamide and an inner layer comprising a material selected from the group consisting of polyvinylidine fluoride and copolymers thereof, wherein said inner and said outer layer are tightly bonded to one another by at least one adhesion-promoting intermediate layer of a polyamide/polyvinylidine fluoride blend, said blend having a polyamide matrix with dispersed polyvinylidine fluoride phases having a spherical morphology; wherein said polyamide is a polyamide 12 and wherein the weight ratio of said polyamide to said polyvinylidine fluoride in said blend is 70:30; and wherein said polyamide of said polyamide/polyvinylidine fluoride blend has a shear viscosity of 3.33 times greater than that of said polyvinylidine fluoride of said blend, wherein said blend is produced by extrusion at a temperature in the range of 220° to 270° C.

3. A multilayer polymer tube according to claim 2, wherein said inner layer has a thickness in the range of from about 0.05 mm to about 0.5 mm.

4. A multilayer polymer tube according to claim 2, wherein said outer layer has a thickness in the range of from about 0.1 mm to about 2 mm.

5. A multilayer polymer tube according to claim 2, wherein said intermediate layer has a thickness in the range of from about 0.05 mm to about 0.5 mm.

6. A multilayer polymer tube according to claim 2, where at least portions of the tube are fashioned with annular or spiral corrugation.

* * * * *